A. F. PETERSON.
PULVERIZER.
APPLICATION FILED JAN. 13, 1909.
927,277.
Patented July 6, 1909.
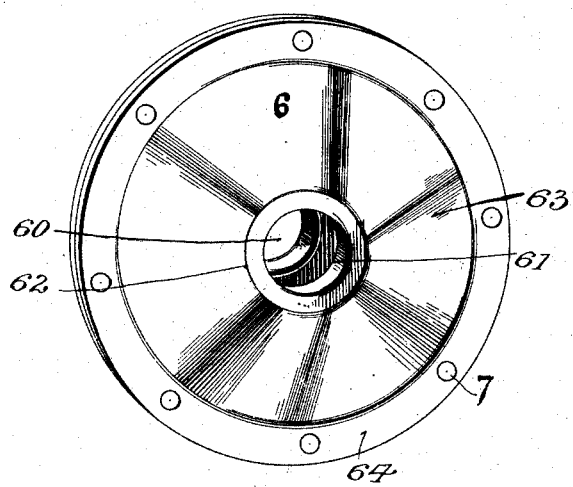
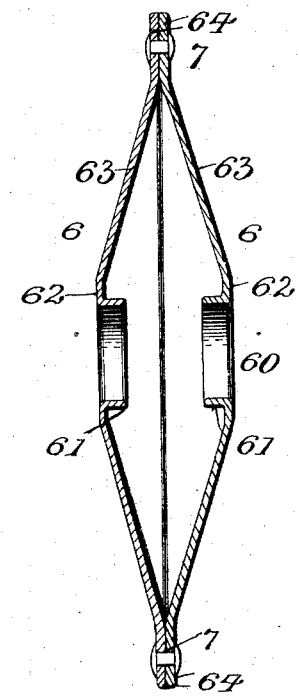
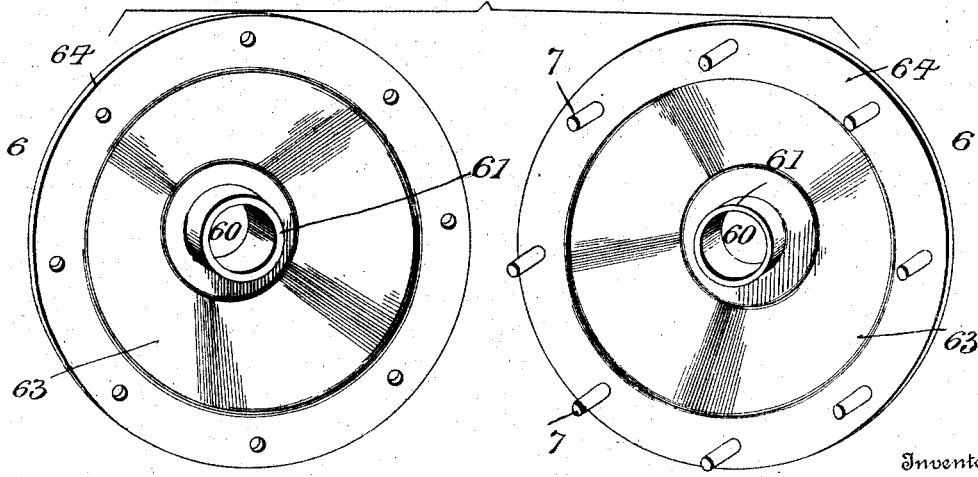

UNITED STATES PATENT OFFICE.

AUGUST F. PETERSON, OF KENT, OHIO.

PULVERIZER.

No. 927,277.     Specification of Letters Patent.     Patented July 6, 1909.

Application filed January 13, 1909.   Serial No. 472,054.

*To all whom it may concern:*

Be it known that I, AUGUST F. PETERSON, a citizen of the United States, residing at Kent, Portage county, Ohio, have invented certain new and useful Improvements in Pulverizers; and I do hereby declare the following to be a full, clear, and exact description of the invention, such as will enable others skilled in the art to which it appertains to make and use the same.

This invention relates to certain improvements in agricultural implements and more particularly relates to what are commonly known as pulverizers, clod crushers or levelers or the like; and the objects and nature of the invention will be readily understood by those skilled in the art in the light of the following description of the accompanying drawings showing what I now consider my preferred embodiment from among other formations within the spirit of my invention.

The invention consists in certain novel features in construction and in the combinations and arrangements as more fully and particularly set forth and specified hereinafter.

Referring to the accompanying drawings:—Figure 1, is a perspective view of a pulverizer disk of my invention. Fig. 2, is a sectional view thereof. Fig. 3, is a perspective view showing the two members of a disk separated.

A particular object of this invention is to provide certain improvements in pulverizer disks adapted for use in pulverizers wherein one or more series of such disks are employed; the disks of each series being loosely arranged end to end on a rotary shaft so as to be capable of separate and independent rotation on the shaft and so that a series of disks can rotate with the shaft, although I do not wish to so limit my invention.

The wheels or disks are all preferably alike or similar in form and dimensions, and each wheel is composed of two similar plates, sections, halves, or disks 6, usually pressed or struck-up from sheet steel or the like of the required gage and quality, and a series of rivets 7, or equivalent means rigidly securing the plates together in a peculiar manner, to form the complete article.

Each circular plate 6, is formed with a central bearing or hub opening 60, to receive the shaft, surrounded by an annular concentric inwardly projecting bearing flange 61. Each plate is dished to form the central flat end face 62, terminating in the annular inclined faces or beveled portion 63, which terminates in the peripheral flat edge portion or rim 64, transversely perforated usually at frequent uniformly-spaced intervals to receive the transversely arranged rivets 7. Any two of these similar dished plates or disks are then arranged with their dished sides or faces together and with their openings 60, alined. The flat inner faces of the rims or edge portions 64, of the two plates will then lie parallel and squarely abut and the rivets 7, are passed through the alined perforations in said rims and are headed to most tightly and rigidly clamp and lock said rims together and thereby secure the plates rigidly and permanently together to form the complete wheel in its permanent form. The wheel thus composed of the two disks is hollow and is of greatest width or length at its center or hub and is formed with the flat end faces 62, for abutting and bearing against the corresponding faces of adjacent wheels, on the same shaft and thereby spacing the beveled portions of the wheels formed by the inclined faces 63, of the two plates. The side faces of each wheel converge to the surrounding flat edge formed by the flat rims of the two plates and projecting a substantial distance radially beyond the beveled or converging side faces. The wheel is thus formed with a projecting flat earth cutting and penetrating edge which is of great strength and rigidity, being two-ply, that is formed of two thicknesses of metal plates braced, strengthened and rigidly clamped together by the series of rivets passing transversely therethrough and constituting the sole means securing the plates together.

Material advantages are attained by thus forming the wheels of similar sheet metal plates, which can be economically struck up, and securing the plates together at their flat rims to form the two-ply annular penetrating edge of substantial length.

What I claim is:—

1. A pulverizer disk having a central axle-receiving bore, and converging side faces terminating in a surrounding flat projecting two-ply rim, said disk consisting of two similar dished metal plates, each having a surrounding flat radial outer edge portion, said plates being arranged side by side with said edge portions thereof parallel and engaging at their flat inner side faces, and means rigidly securing and clamping said plates together to form the two-ply rim and maintain the disk in permanent form.

2. In pulverizers, a disk composed of two similar dished metal plates, each having a central bore and beveled to a projecting flat peripheral rim, said two plates arranged side by side with their rims parallel and engaging at their inner side faces to form the disk with a two-ply surrounding projecting rim, and rivets passed transversely through said rims and rigidly clamping and securing the plates together to form the disk.

3. A pulverizer disk composed of two similar dished sheet metal plates each having a surrounding projecting outer edge portion, and means passing transversely through and clamping said plates together with their edge portions engaging to form the two-ply rim.

In testimony whereof I affix my signature, in presence of two witnesses.

AUGUST F. PETERSON.

Witnesses:
C. H. CURTISS,
I. E. WURSTER.